Sept. 26, 1961     O. RELLENSMANN ET AL     3,001,290
GYROSCOPIC COMPASS
Filed Aug. 8, 1956     3 Sheets-Sheet 1

INVENTORS
Otto Rellensmann
Karl-Heinrich Stier
by Malcolm W. Fraser
attorney

Sept. 26, 1961   O. RELLENSMANN ET AL   3,001,290
GYROSCOPIC COMPASS
Filed Aug. 8, 1956   3 Sheets-Sheet 2
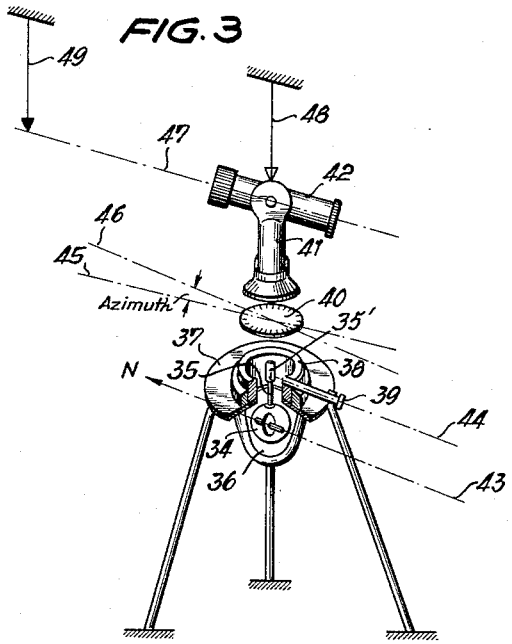
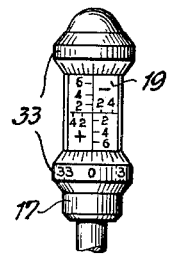
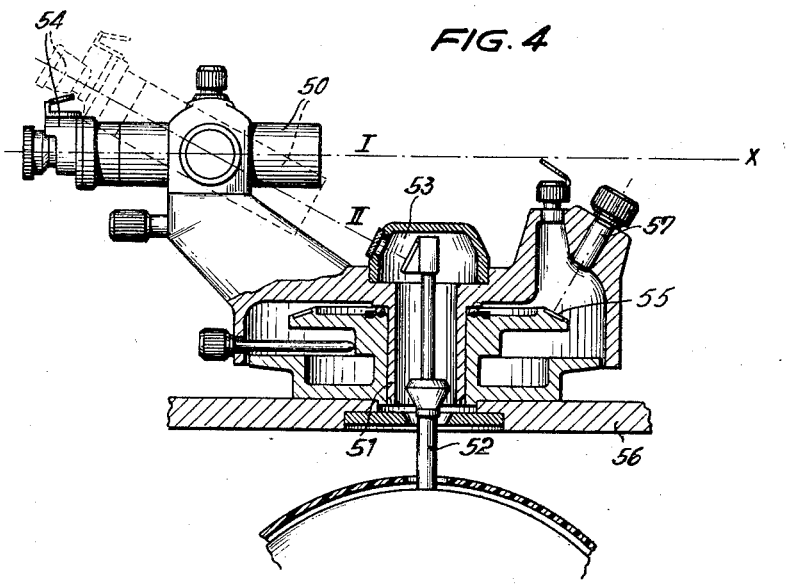
INVENTORS
Otto Rellensmann
Karl-Heinrich Stier
by Malcolm W. Fraser
attorney

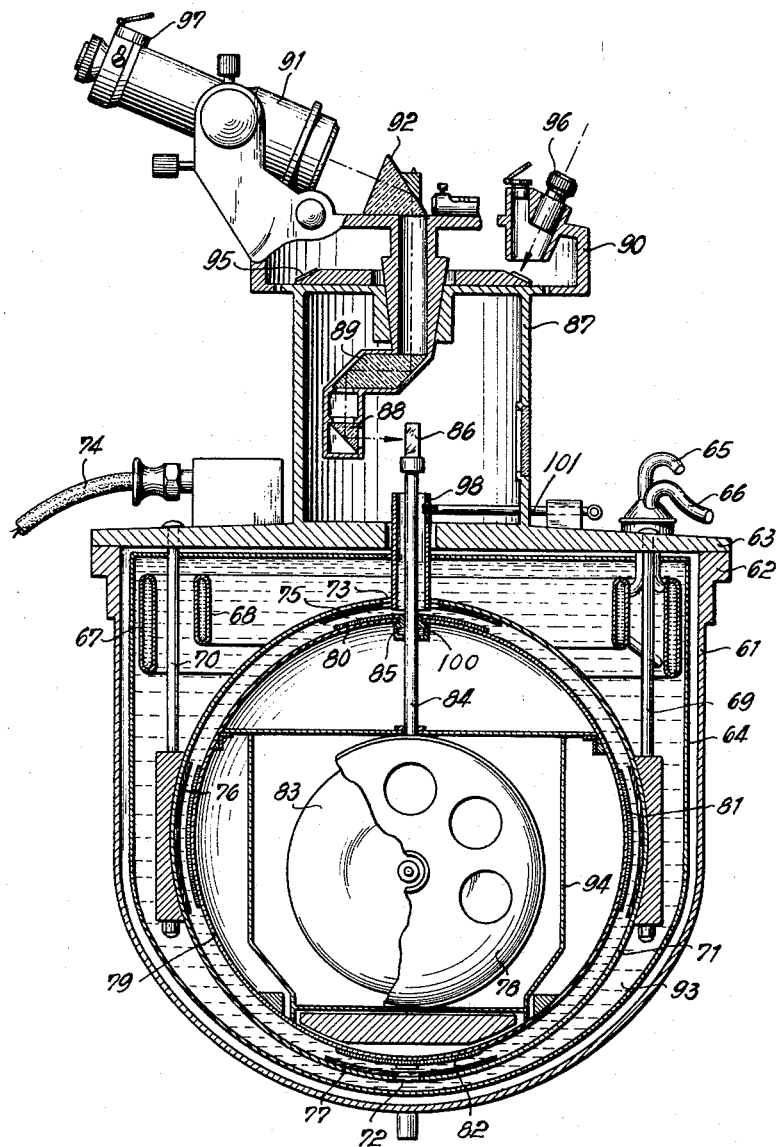

United States Patent Office 3,001,290
Patented Sept. 26, 1961

3,001,290
GYROSCOPIC COMPASS
Otto Rellensmann, Clausthal-Zellerfeld, and Karl-Heinrich Stier, Dortmund, Germany, assignors to Lear, Incorporated, Santa Monica, Calif., a corporation of Illinois
Filed Aug. 8, 1956, Ser. No. 602,847
Claims priority, application Germany Dec. 28, 1955
6 Claims. (Cl. 33—72)

The present invention relates to a gyroscopic surveying compass, and particularly such a compass which is provided with a mirror for indirectly determining and reading the direction of the axis of the gyroscope which is preferably mounted within a hollow body suspended in a carrier fluid.

A gyroscopic compass of this type made according to prior proposals operates with a mirror which is mounted on one of the two bearings of the gyroscope shaft, while the direction is read by means of theodolites which are eccentrically mounted. In determining the axial direction of the compass by observing the rotary oscillations thereof, compasses of this type only permit relatively small amplitudes since the field of view of the fixed reading telescope is quite limited.

Such limitation of the amplitudes also applies if the direction is determined by electric means. Even though the degree of accuracy is increased by this method, it is also quite limited in its application because of the resulting increase in elements of the apparatus and the sources of error occurring thereby which cannot be rectified.

It is an object of the present invention to provide a gyroscopic surveying compass which permits the rotary oscillations of the gyroscope to be of any desired amplitude relative to its north position and to be read by means of a centrally adjustable mirror.

Another object of the present invention is to provide a gyroscopic surveying compass in which a mirror reading at the vertical axis of the gyroscopic system permits a relatively large latitude of the residual eccentricity between the rotary axis of the mirror and the indicating system as compared with graduation or line marks which have to be read twice in order to compensate for residual eccentricities.

A further object of the invention is to provide a relatively small apparatus of the type described, in which the essential reading instruments are mounted in a fixed position and are few and relatively inexpensive.

Another object of the invention is to provide an apparatus of this kind which only consists of relatively few individual instruments, and in which these instruments are of a type as commonly used in surveying and designed to avoid any possible errors of internal correlation.

Still another object of the invention is to provide a gyroscopic surveying compass which, as compared with an electrical direction indication, requires a minimum of individual readings which, in turn, only require a very short time, so that the entire apparatus may be easily operated by one person.

More specifically, the present invention resides in a gyroscopic surveying compass which is provided with a device for taking an indirect reading of the direction of the axis of the gyroscope which is mounted in a hollow body which is suspended in a carrier fluid.

The invention further consists in a mirror which is rigidly mounted above the carrier fluid on a vertical rod which is connected to the hollow body supporting the gyroscope, the rotary bearings of which are mounted in the hollow body.

The invention furthermore resides in a gyroscopic surveying compass which is provided with a sighting telescope with an autocollimator which cooperates with the mirror and is adjustable to the normal plane of the mirror and pivotable about the axis of the vertical rod.

Further objects, features, and advantages of the present invention will be apparent from the following detailed description thereof which is to be read with reference to the accompanying drawings, in which:

FIG. 2 shows a rear view of the mirror support according to FIG. 1;

FIG. 3 is a diagrammatic perspective illustration of an orientation method which may be carried out by means of a gyroscopic compass according to the invention;

FIG. 4 shows a modification of the gyroscopic compass according to the invention partially in section, the sections shown at opposite sides of the vertical center line being taken at ninety degrees to each other; while FIG. 5 shows a further modification of the compass according to the invention.

Figure 1:
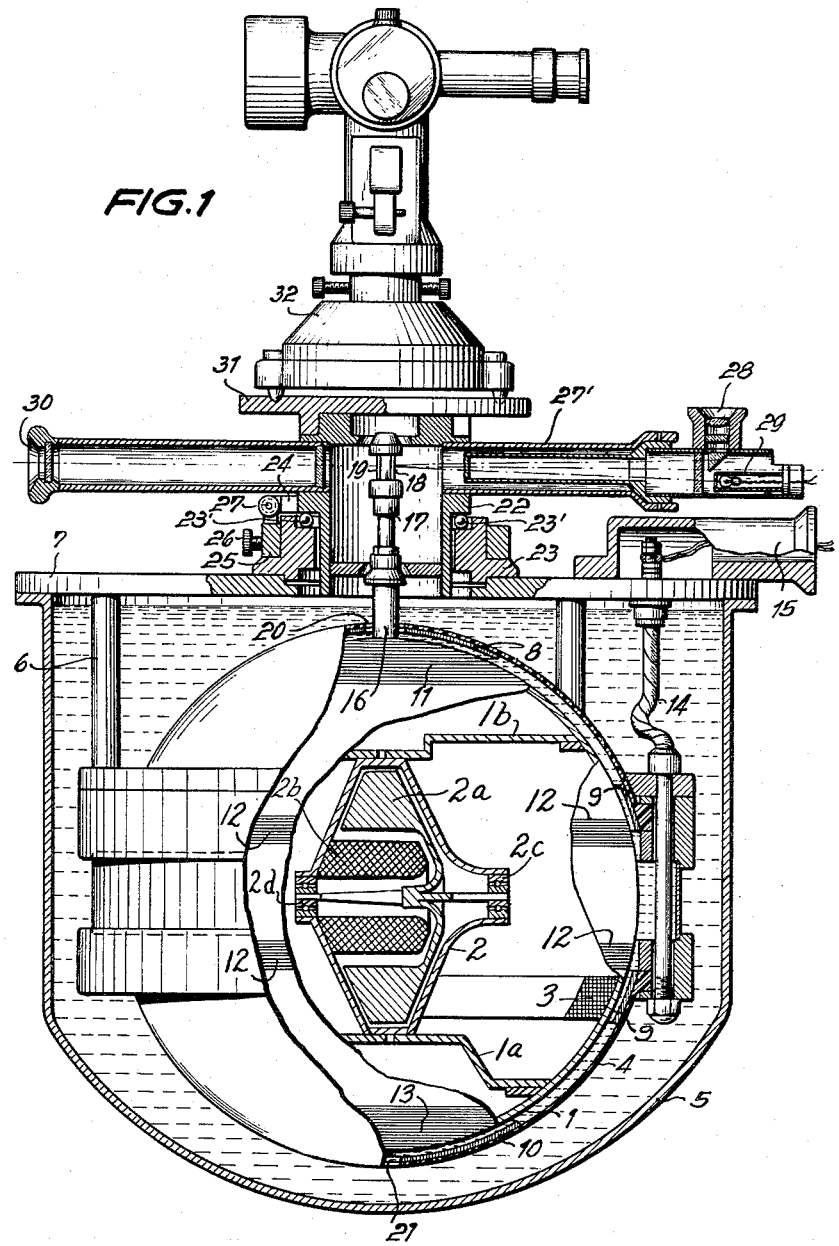
FIG. 1 shows, partly in cross section, a front view of a gyroscopic surveying compass according to the invention.

Referring to the drawings, and first particularly to FIG. 1, the spherical body 1 supports the casing 2 of a gyro having a horizontal axis of rotation and an induction coil 3 which centers the spherical body 1 electromagnetically within the surrounding spherical housing 4. The sphere 1 is suspended in the carrier fluid which is filled into a container 5 and passes to the inside of the spherical housing 4 through openings 20 and 21. The spherical housing 4 may be secured to the cover 7 of the container 5 by means of connecting rods 6. Electric current for the three phases of the revolving gyroscope which constitutes a three-phase induction motor is supplied by means of graphitic conducting surfaces 8, 9, and 10 on the inside of the spherical housing 4 which are connected with corresponding graphitic conducting surfaces 11, 12, and 13 on sphere 1 through the carrier fluid which, for this purpose, is acidified. Since the spherical housing 4 is stationary, the three phases of the current may be supplied to housing 4 through rod conductors or flexible cables 14 and a flameproof junction box 15.

The gyro casing 2 is rigidly mounted within the spherical body or casing 1. The lower end of the casing 2 is fixedly secured to a cross brace 1a, the ends of which are suitably secured to the interior surface of the casing 1; while the upper end of the casing 2 is fixedly secured to a cross brace 1b, the ends of which are suitably secured to the interior surface of the casing 2 in the same manner as the cross brace 1a. A gyro rotor 2a is rotatably mounted within the gyro casing 2 and is adapted to rotate about a horizontal spin axis within journal elements 2c and 2d. The rotor 2a is formed of a permanent magnet type material and cooperates with an electrical winding or stator 2b supplied with electrical energy through suitable electrical conductors, not shown, in electrical contact with the electrical conducting surface 12. It will be appreciated that upon energization of the winding or stator 2b the rotor 2a is caused to rotate about a horizontal axis.

Sphere 1 carries on its upper terminal 11 a rod 16 which extends through the upper opening 20 of the spherical housing 4 and has a member 17 secured to its free end which carries a mirror 18 and, on the rear side thereof, a graduated scale plate 19, as shown separately in FIG. 2. An adjusting head 22 is provided coaxially to rod 16, and fits accurately into a collar or race 23 on cover 7 and is rotatably supported thereon by balls 23'. Adjusting head 22 has a tongue 24 which is engaged by a fine-adjusting screw 27 which is mounted in a ring 25 which, in turn, serves for the coarse adjustment of adjusting head 22 and may be locked in place by a setscrew 26. The adjusting head 22 has a tubular member 27' secured thereto which adjustably supports therein an autocollimator which, however, is modified so that the eyepiece 28 is viewed from above, while the illumination by the filament 29 extends in the axial direction. Mounted on adjusting head 22 diametrically opposite to the autocollimator is a diopter reading device 30 with graticules which permits the vertical and lateral positions of the mirror support 17 to be read on the graduated scale 19 for thus determining the position of the sphere 1 which supports gyroscope casing 2.

The upper end of adjusting head 22 carries a table plate 31 which supports centrally thereon a theodolite 32 which is adjustable relative thereto.

FIG. 2 shows the mirror support 17 with the graduated scale plate 19 and the barrel scale 33 thereon. These graduations permit a coarse adjustment of the gyro axis and a coarse reading of the size of the amplitude of the rotary oscillations by means of the reading device 30 after, in the assembly of the instrument, the starting point of the 360° scale has been correlated as far as possible with the direction of the gyro axis.

FIG. 3 diagrammatically illustrates the manner of orientation of a fixed line.

In this FIGURE 3, a container 36 corresponding to the container 5 of FIGURE 1 is mounted on a tripod. It contains the gyroscope rotatably mounted in the sphere 34 corresponding to the sphere 1 of FIGURE 1. The sphere 34 together with a rod 35 carries out rotary oscillations about a vertical axis. The central position of such oscillations is determined by the north direction 43. The rod 35 corresponding to rod 16 in FIGURE 1 supports a mirror 35'. By adjusting the autocollimator 39 within an adjusting head 38 corresponding to the head 22 of FIGURE 1 to the mirror plane from the normal direction 44 to the reversal point of the oscillations (maximum amplitude), the theodolite, together with a sighting telescope 42 and a dial 40, will be angularly displaced by the same angle with respect to a fixed line 47 which is determined by the plumb line 48 under which the instrument is placed centrally and by the plumb line 49 which represents the target. The dial 40, the telescope 42, and the head 38 are shown in exploded view to facilitate the understanding of the operation of the various parts, but they are actually coaxially interconnected. When the telescope 42 on the alidade 41 is returned from the position indicating the maximum amplitude of the rotary oscillations back to the target line, the numerical value of this amplitude may be determined by a reading on the dial 40. The average value of a series of reversal points thus determined gives the orientation of the starting point for the dial which is designated as the direction 45. Line 46 designates the north direction in the plane of dial 40. This line is parallel to line 43. The angle between the directions 45 and 46 is the azimuth to be determined. By reference to a known direction it is possible to determine the possible residual angle between the gyro direction 43 and the normal 44 to the mirror plane which cannot be measured directly and to use the same as a correction value. The exactly central position of the theodolite on the instrument may be checked by aiming the autocollimator 39 and the sighting telescope 42 on the same target when mounting the theodolite. At the same time, the dial is then read or placed on zero whereby the correlation between the normal to the mirror plane and the starting point of the dial may be determined as accurately as desired.

The theodolite as illustrated does not have to form a part of the gyroscopic instrument but any separate theodolite may be placed on the table plate 31, as shown in FIG. 1, which may also be exchanged for a different table to accommodate the respective theodolite to be mounted on the instrument. However, the theodolite may also be solidly connected with the gyroscopic instrument and be made a part thereof. If the theodolite is solidly connected with table plate 31 or the adjusting head 22, there will be practically no change in the manner in which the method is carried out. If, however, the adjusting head 22 is omitted and the theodolite is placed directly upon the cover plate 7 of the instrument, or if the adjusting head is fixed in position, the reading and plotting of the direction may be carried out by connecting the autocollimator with the alidade of the theodolite. The adjustment of the autocollimator to the mirror normal will then not result in a corresponding pivotal movement of the theodolite, that is, of the sighting telescope together with the dial relative to the fixed line, but only in a pivotal movement of the sighting telescope alone, while the dial will remain in the direction which depends upon the incidental orientation of the entire instrument when set up. The reversal points may then be read directly on the dial without aiming. The orientation of the fixed line relative to the direction of the gyro axis, which is determined directly on the dial from the reversal points as the mean position, is then carried out before and/or after the determination of the axial direction of the gyro in the manner as usual in carrying out theodolite measurements either by a single or repeated measurements.

FIG. 4 shows a modification in construction of the apparatus for carrying out the last-mentioned method. It shows the theodolite of special design with the sighting telescope 50 extending toward the rear. The telescope 50 is designed to act at the same time as an autocollimator so that in this embodiment a separate autocollimator may be dispensed with. The shaft 51 forming the rotary axis of the theodolite is in this case of hollow shape and its inside forms the clearance for the adjusting head into which the rod 52 carrying the mirror 53 projects. Mirror 53 is inclined to the axis so that in position II of the sighting telescope 50, the reversal point may be determined after the autocollimator 54 has been connected, while in position I the adjustment toward the target point of the fixed line is made. Although the embodiment shown in FIG. 4 would ordinarily be limited in its application because it cannot include any strongly downwardly inclined lines of sight, such deficiency may be easily avoided by the use of suitable optical means. The member 57 in FIG. 4 represents a reading microscope which is to be regarded as being pivoted about an angle of 90° to the position as shown while numeral 55 indicates the graduated dial. Naturally, the dial may also be mounted adjustably on a second concentric axis. Numeral 56 indicates the cover plate of the container holding the sphere which carries the gyroscope, as shown in FIG. 1.

FIG. 5 llustrates a further valuable improvement of the gyroscopic surveying compass according to the invention. The container 61 has a reinforcing flange 62 at its upper edge which supports the cover 63. The inside of this closed container 61, 62 is lined with a screening plate as protection against outer magnetic fields forming a housing 64. The entire inside of the screening housing 64 is filled with the carrier fluid 93. Cover 63 further carries the lead-in for the conduits 65 and 66 for the cooling pipes 67 and 68, respectively, for cooling the temperature of the carrier fluid or for keeping it constant. Within housing 64 and suspended from cover 63 on rods 69 and 70 is the spherical housing 71 which is provided above and below with inlet and outlet openings 72 and 73, respectively, for the passage of the carrier fluid. Spherical housing 71 is supplied with three-phase alternating current to the three graphitic contact surfaces 75, 76, and 77 through a lead-in conductor 74 and internal conductors not shown. Within the spherical housing 71, the sphere 79 is provided which carries the gyro 83 and is provided on the outside with graphitic contact surfaces 80, 81, and 82 corresponding to those on the spherical housing 71. In order to insure a flow of current between contact surfaces 75, 76, 77 and 80, 81, 82, respectively, the carrier fluid is preferably acidified so as to act as an electrolyte. A gyro casing 78 supports the gyro 83 and is secured to the sphere 79 through a supporting frame 94. The rod 84 is directly connected to gyro casing 78 and extends through the bushing 85, carrying the mirror 86 at its upper end. The inside of sphere 79 must be sealed relative to bushing 85 on rod 84 so that, if the sphere 79 is deformed, no forces will be transmitted to rod 84. For this purpose, sealing means 100 may be of suitable plastic or resilient material. A sleeve bushing 98 which is axially movable by means of a suitable actuating element 101, as indicated in FIG. 5, can be used for locking the sphere 79 by engaging the same at the top to prevent damage to the sensitive parts associated therewith during the transportation of the instrument. Preferably integral with cover 63 is a housing 87 containing the deflecting means, for example, prisms 88 and 89 which are secured to the rotatable member 90. This member 90 forms the part of a theodolite which is rotatable with respect to a circular dial 95 mounted on the housing 87, and the rotary axis of the theodolite coincides with the axis of rod 84. Member 90 carries a sighting telescope 91 with an autocollimator 97, the ray path of which is deflected by a further prism 92. The position of the gyroscope may thus be read on dial 95 by means of a reading microscope 96, and this position together with the adjustment of the sighting telescope 91 which may be read on the same dial may be correlated relative to a target. Naturally, if the principles of the invention are applied to a gyro which is suspended on a flexible strip or cord, the cover sphere with the electric current leads and contact surfaces thereon will be dispensed with since they may be provided in any other suitable manner. Rod 84 will then be made in the form of a hollow shaft and the suspension cord be passed through the shaft, and the latter itself be used for carrying the electric conductors and similar elements which are required for operating the gyroscopic compass.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A gyroscopic surveying compass comprising in combination, a container; a housing in said container; means for supporting said housing in said container; a casing and means supporting the same for universal movement within said housing; a gyro in said casing, said gyro including a rotor having a horizontal spin axis; means disposed within and fixed relative to said casing for rotatably supporting said rotor for rotation about the horizontal spin axis thereof; a vertical shaft rigidly connected with said casing, a mirror secured to said shaft near the upper end thereof, a sighting telescope having autocollimator means alignable with said mirror, and means fixed with respect to said housing for supporting said telescope and adapting the same to be pivoted about a vertical axis, substantially coinciding with the axis of said vertical shaft.

2. A gyroscopic surveing compass as defined in claim 1 wherein said sighting telescope is eccentrically mounted relative to the axis of said shaft in a direction of the optical axis of said telescope.

3. A gyroscopic surveying compass as defined in claim 1 wherein said vertical shaft extends through a hole in said casing.

4. A gyroscopic surveying compass as defined in claim 1 including a lining of a magnetic alloy in said container for protecting said gyro from external magnetic fields.

5. A gyroscopic surveying compass as defined in claim 3 including a plastic means for resiliently padding and sealing said shaft in said hole relative to said casing.

6. A gyroscopic surveying compass as defined in claim 1 wherein said vertical shaft extends through a hole in the upper portion of said housing, thereby limiting the universal movement of said casing within said housing.

References Cited in the file of this patent
UNITED STATES PATENTS

| | | |
|---|---|---|
| 281,267 | Harmon | July 17, 1883 |
| 1,628,777 | Henderson | May 17, 1927 |
| 2,775,158 | Mitchell | Dec. 25, 1956 |

FOREIGN PATENTS

| | | |
|---|---|---|
| 987,894 | France | Apr. 18, 1951 |
| 682,908 | Great Britain | Nov. 19, 1952 |